July 14, 1953 — H. LOWENTHAL — 2,645,157
PHOTOGRAPHIC OBJECTIVE OF THE TRIPLET TYPE
Filed May 15, 1952
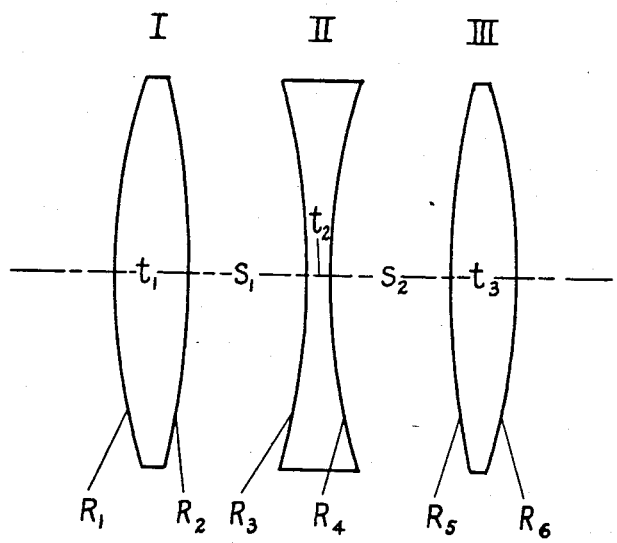
Inventor:
Herman Lowenthal
By Zabel, Baker, York, Jones & Dithmar
Attorneys.

Patented July 14, 1953

2,645,157

UNITED STATES PATENT OFFICE 2,645,157

PHOTOGRAPHIC OBJECTIVE OF THE TRIPLET TYPE

Herman Lowenthal, Chicago, Ill., assignor to General Scientific Corporation, Chicago, Ill., a corporation of Illinois Application May 15, 1952, Serial No. 287,959

2 Claims. (Cl. 88—57)

My invention relates to a photographic objective of the triplet type, and particularly to such an objective for use with professional movie camera equipment. Such equipment requires high speed objectives in long focal length (six inches), and thus, at the same time, imposes severe demands with regard to excellence of resolution.

Photographic objectives of the triplet type have been known for many years and have been developed for varied applications. However, in the design of such objectives, the workers in this field have heretofore considered a wide aperture such as F:3 or the like to be incompatible with normal angular extent of field and satisfactory correction. For example, triplets with apertures of this order generally provide only a sharp central image and thus fail to have a satisfactory field covering power.

Long focal length objectives of the triplet type, even with a limited coverage of about 5° of half angle, have to be carefully designed to provide satisfactory definition. In the design of such objectives, it appears that if the amount of astigmatism is to be small, then a curved field and a necessarily restricted angle of coverage results. On the other hand, if astigmatism can be tolerated to a moderate degree, then it is possible to obtain an increased flat image field and have increased angular covering power.

I have discovered that a photographic objective of the triplet type may be designed to have a normal field coverage of about 28° half angle and at the same time have an astigmatically flat field in addition to the usual corrections for sine condition, spherical aberration, coma, distortion and chromatic aberration. The objective embodying my present invention may be used either as a short focal length objective for wide angle work or as a long focal length objective for narrow angle work.

The objective embodying my invention follows the customary pattern of having three separate components with air spaces therebetween. However, in other respects, the objective embodying the invention departs from conventional triplet construction.

One important characteristic of my new objective resides in the fact that the radii of curvature of the front surface of the first component, the rear surface of the second component and rear surface of the third component are substantially equal and are approximately 40% of the focal length of the objective. In further particular, the rear surface radii of curvature of the second and third components are within 3% of the radius of curvature of the front surface of the first component.

Another characteristic is that the radius of curvature of the rear surface of the first component is large in comparison to the focal length of the objective, and in particular will range from between nine to ten times the focal length of the objective. The radius of curvature of the front surface of the third component is larger than the focal distance by a factor of about 2.4.

By observing the above conditions, a triplet objective may be designed having an aperture ratio of F:3 or between F:3 and F:4. The spherical aberration and sine condition have a maximum zonal aberration of about 0.5% of the focal length. The two aberrations, spherical aberration and sine aberration, for different zones come out to be substantially equal in amount and less than maximum permissible aberration. By virtue of this coincidence, freedom from coma results, and it is possible to obtain an image having a high degree of clarity and definition.

The single figure in the accompanying drawing illustrates an objective embodying my invention. The reference numerals and letters thereon are conventional.

The diaphragm (not shown) for the objective may be disposed between the second and third components or to the right of the third component as seen in the drawing.

The design data for an objective embodying my invention are set forth below. In this example, a positive radius of curvature is one where a ray of light traveling from left to right encounters a convex surface, and a negative radius of curvature denotes a concave surface. The distances, such as $t_1$, are measured at the axis of the component while the separation in air, such as $s_1$, is measured between the vertices of the opposed lens surfaces. The quantity $N_D$ indicates the index of refraction referred to the D line of a sodium flame, while V is the dispersion number, both quantities being constants for the glass used.

Focal length = 100
Back focal distance = 84.3
Aperture = F:3

| Lens | $N_D$ | V | Radii | Axial Distances |
|---|---|---|---|---|
| I | 1.638 | 55.5 | $R_1 = +40.5$ | $t_1 = 6.0$ |
| | | | $R_2 = -942.7$ | $s_1 = 9.2$ |
| II | 1.648 | 33.8 | $R_3 = -50.5$ | $t_2 = 2.0$ |
| | | | $R_4 = +41.7$ | $s_2 = 9.9$ |
| III | 1.638 | 55.5 | $R_5 = +243.5$ | $t_3 = 6.0$ |
| | | | $R_6 = -39.4$ | |

From the above description it is thought that the construction and advantages of my invention will be readily apparent to those skilled in the art. Various changes in detail may be made without departing from the spirit or losing the advantages of the invention.

Having thus described my invention, what I claim as new and desire to secure by Letters Patent is:

1. A photographic objective of the triplet type consisting of three components, the radii of curvature of the front surface of the first component and the rear surfaces of the second and third components being substantially equal and approximately 40% of the focal length of the objective, the radius of curvature of the rear surface of the first component being between nine and ten times the focal length of the objective, the radius of curvature of the front surface of the third component being substantially 2.4 times the focal length of the objective and the radius of curvature of the front surface of the second component being substantially equal to one-half of the focal length of the objective, the three components having axial thicknesses respectively of substantially 0.06, 0.02 and 0.06 times the focal length of the objective, the axial distance between the first and second components being substantially 0.092 and the axial distance between the second and third components being substantially 0.099, both times the focal length of the objective, said objective being characterized by having an aperture ratio of between F:3 and F:4 and being fully corrected and having a high degree of resolution.

2. A photographic objective having full correction and having a high degree of resolution having substantially the following characteristics, where R is the radius of curvature of a component going from front to rear, $t$ and $s$ being respectively the axial thickness and separation, $N_D$ being the index of refraction and V being the dispersion number of the glass:

Focal length = 100
Back focal distance = 84.3
Aperture = F:3

| Lens | $N_D$ | V | Radii | Axial Distances |
|---|---|---|---|---|
| I | 1.638 | 55.5 | $R_1 = +40.5$ | $t_1 = 6.0$ |
|   |       |      | $R_2 = -942.7$ | $s_1 = 9.2$ |
| II | 1.648 | 33.8 | $R_3 = -50.5$ | $t_2 = 2.0$ |
|    |       |      | $R_4 = +41.7$ | $s_2 = 9.9$ |
| III | 1.638 | 55.5 | $R_5 = +243.5$ | $t_3 = 6.0$ |
|     |       |      | $R_6 = -39.4$ |  |

HERMAN LOWENTHAL.

References Cited in the file of this patent

UNITED STATES PATENTS

| Number | Name | Date |
|---|---|---|
| 2,391,114 | Aklin | Dec. 18, 1945 |
| 2,430,550 | Altman et al. | Nov. 11, 1947 |
| 2,453,260 | Pestrecoy | Nov. 9, 1948 |
| 2,487,873 | Herzberger et al. | Nov. 15, 1949 |

FOREIGN PATENTS

| Number | Country | Date |
|---|---|---|
| 434,759 | Germany | Sept. 29, 1926 |